United States Patent
Kalyanasundharam et al.

(10) Patent No.: US 12,167,102 B2
(45) Date of Patent: Dec. 10, 2024

(54) MULTICAST IN THE PROBE CHANNEL

(71) Applicant: Advanced Micro Devices, Inc., Santa Clara, CA (US)

(72) Inventors: Vydhyanathan Kalyanasundharam, San Jose, CA (US); Joe G. Cruz, North Grafton, MA (US); Eric Christopher Morton, Austin, TX (US); Alan Dodson Smith, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/138,117

(22) Filed: Sep. 21, 2018

(65) Prior Publication Data

US 2020/0099993 A1 Mar. 26, 2020

(51) Int. Cl.
*H04W 72/00* (2023.01)
*H04L 12/18* (2006.01)
*H04L 12/50* (2006.01)
*H04L 12/54* (2022.01)
*H04L 45/021* (2022.01)
*H04L 45/745* (2022.01)
*H04L 47/6275* (2022.01)
*H04L 49/101* (2022.01)
*H04L 65/1101* (2022.01)
*H04L 65/611* (2022.01)
*H04N 19/164* (2014.01)
(Continued)

(52) U.S. Cl.
CPC ..... *H04N 21/6405* (2013.01); *H04L 12/1813* (2013.01); *H04L 65/1101* (2022.05); *H04L 65/611* (2022.05); *H04N 19/164* (2014.11); *H04N 19/169* (2014.11)

(58) Field of Classification Search
CPC ....... G06F 3/0659; H04L 41/04; H04L 45/00; H04L 45/54; H04L 49/1576; H04L 2012/5605; H04L 49/201; H04L 65/611; H04L 49/101; H04L 201/5681; H04L 49/108; H04Q 11/0005; H04J 14/0212
USPC ............................................. 370/356, 395.31
See application file for complete search history.

(56) References Cited

U.S. PATENT DOCUMENTS 5,303,362 A 4/1994 Butts, Jr. et al.
5,412,788 A 5/1995 Collins et al.
(Continued)

*Primary Examiner* — Kibrom T Hailu
*Assistant Examiner* — Jason A Harley
(74) *Attorney, Agent, or Firm* — Kowert, Hood, Munyon, Rankin & Goetzel, P.C.; Rory D. Rankin

(57) ABSTRACT

Systems, apparatuses, and methods for processing multi-cast messages are disclosed. A system includes at least one or more processing units, one or more memory controllers, and a communication fabric coupled to the processing unit(s) and the memory controller(s). The communication fabric includes a plurality of crossbars which connect various agents within the system. When a multi-cast message is received by a crossbar, the crossbar extracts a message type indicator and a recipient type indicator from the message. The crossbar uses the message type indicator to determine which set of masks to lookup using the recipient type indicator. Then, the crossbar determines which one or more masks to extract from the selected set of masks based on values of the recipient type indicator. The crossbar combines the one or more masks with a multi-cast route to create a port vector for determining on which ports to forward the multi-cast message.

17 Claims, 10 Drawing Sheets

(51) Int. Cl.
  *H04N 19/169*     (2014.01)
  *H04N 21/6405*    (2011.01)

(56) References Cited

U.S. PATENT DOCUMENTS

| | | |
|---|---|---|
| 5,517,494 A | 5/1996 | Green |
| 5,537,575 A | 7/1996 | Foley et al. |
| 5,560,038 A | 9/1996 | Haddock |
| 5,659,708 A | 8/1997 | Arimilli et al. |
| 5,673,413 A | 9/1997 | Deshpande et al. |
| 5,684,977 A | 11/1997 | Van Loo et al. |
| 5,749,095 A | 5/1998 | Hagersten |
| 5,859,983 A | 1/1999 | Heller et al. |
| 5,878,268 A | 3/1999 | Hagersten |
| 5,887,138 A | 3/1999 | Hagersten et al. |
| 5,893,144 A | 4/1999 | Wood et al. |
| 5,924,118 A | 7/1999 | Arimilli et al. |
| 5,966,729 A | 10/1999 | Phelps |
| 5,987,544 A | 11/1999 | Bannon et al. |
| 5,991,819 A | 11/1999 | Young |
| 6,012,127 A | 1/2000 | McDonald et al. |
| 6,018,791 A | 1/2000 | Arimilli et al. |
| 6,038,644 A | 3/2000 | Irie et al. |
| 6,049,851 A | 4/2000 | Bryg et al. |
| 6,070,231 A | 5/2000 | Ottinger |
| 6,085,263 A | 7/2000 | Sharma et al. |
| 6,098,115 A | 8/2000 | Eberhard et al. |
| 6,101,420 A | 8/2000 | VanDoren et al. |
| 6,108,737 A | 8/2000 | Sharma et al. |
| 6,108,752 A | 8/2000 | Van Doren et al. |
| 6,112,281 A | 8/2000 | Bamford et al. |
| 6,138,218 A | 10/2000 | Arimilli et al. |
| 6,199,153 B1 | 3/2001 | Razdan et al. |
| 6,209,065 B1 | 3/2001 | Van Doren et al. |
| 6,249,846 B1 | 6/2001 | Van Doren et al. |
| 6,275,905 B1 | 8/2001 | Keller et al. |
| 6,286,090 B1 | 9/2001 | Steely, Jr. et al. |
| 6,292,705 B1 | 9/2001 | Wang et al. |
| 6,295,583 B1 | 9/2001 | Razdan et al. |
| 6,370,621 B1 | 4/2002 | Keller |
| 6,535,489 B1 * | 3/2003 | Merchant ............ H04L 41/0654 370/244 |
| 6,631,401 B1 | 10/2003 | Keller et al. |
| 7,058,053 B1 * | 6/2006 | Schober .................. H04L 12/18 370/390 |
| 7,237,016 B1 * | 6/2007 | Schober .................. G06F 15/02 709/223 |
| 2002/0009095 A1 * | 1/2002 | Van Doren ............. H04L 45/16 370/432 |
| 2003/0002448 A1 * | 1/2003 | Laursen ............... H04L 65/4038 379/202.01 |
| 2003/0088694 A1 * | 5/2003 | Patek ...................... H04L 49/25 709/238 |
| 2004/0114737 A1 * | 6/2004 | MacConnell ........... H04L 12/12 379/106.03 |
| 2005/0152332 A1 * | 7/2005 | Hannum ............... H04L 45/566 370/351 |
| 2007/0168600 A1 * | 7/2007 | Anthony, Jr. ........ H04L 65/1104 711/108 |
| 2008/0016254 A1 * | 1/2008 | Kruger ................ G06F 13/1657 709/251 |
| 2010/0014533 A1 * | 1/2010 | Hirano .................. H04W 8/065 370/401 |
| 2014/0115137 A1 * | 4/2014 | Keisam ................... H04L 41/04 709/223 |
| 2015/0188848 A1 * | 7/2015 | Tran ........................ H04L 49/15 370/417 |
| 2016/0117248 A1 * | 4/2016 | Morton ................ G06F 12/0815 711/141 |
| 2016/0182245 A1 * | 6/2016 | Chen ...................... H04L 45/16 370/236 |
| 2018/0302410 A1 * | 10/2018 | Venkataraman ...... H04L 63/101 |

\* cited by examiner

MULTICAST IN THE PROBE CHANNEL

BACKGROUND

Description of the Related Art

Computing systems are increasingly integrating large numbers of different types of components on a single chip or on multi-chip modules. The complexity and power consumption of a system increases with the number of different types of components. Often, these components are connected together via switches, routers, communication buses, bridges, buffers, controllers, coherent devices, and other links. The combination of these interconnecting components is referred to herein as a "communication fabric", or "fabric" for short.

Generally speaking, the fabric facilitates communication by routing messages between a plurality of components on an integrated circuit (i.e., chip) or multi-chip module. Examples of messages communicated over a fabric include memory access requests, status updates, data transfers, coherency probes, coherency probe responses, system messages, and the like. The system messages can include messages indicating when different types of events occur within the system. These events include agents entering or leaving a low-power state, shutdown events, commitment of transactions to long-term storage, thermal events, bus locking events, translation lookaside buffer (TLB) shootdowns, and so on. With a wide variety of messages to process and with increasing numbers of clients on modern system on chips (SoCs) and integrated circuits (ICs), determining how to route the messages through the fabric can be challenging.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for processing multi-cast messages are disclosed herein. In one implementation, a system includes at least one or more processing units, one or more memory controllers, and a communication fabric coupled to the processing unit(s) and the memory controller(s). The communication fabric includes a plurality of crossbars which connect various agents within the system. When a multi-cast message is received by a crossbar, the crossbar extracts a message type indicator and a recipient type indicator from the message. The crossbar uses the message type indicator to determine which set of masks to lookup using the recipient type indicator. Then, the crossbar determines which one or more masks to extract from the selected set of masks based on values of the recipient type indicator. The crossbar combines the one or more masks with a multi-cast route to create a port vector for determining on which ports to forward the multi-cast message. It is noted that while the term "crossbar" is used in the following discussion, various implementations need not be fully connected or otherwise have a particular design. Rather, the term "crossbar" contemplates any type of switching structure with multiple input/output ports that is configured to receive data via one or more ports and selectively convey corresponding data via one or more ports.

Figure 1:
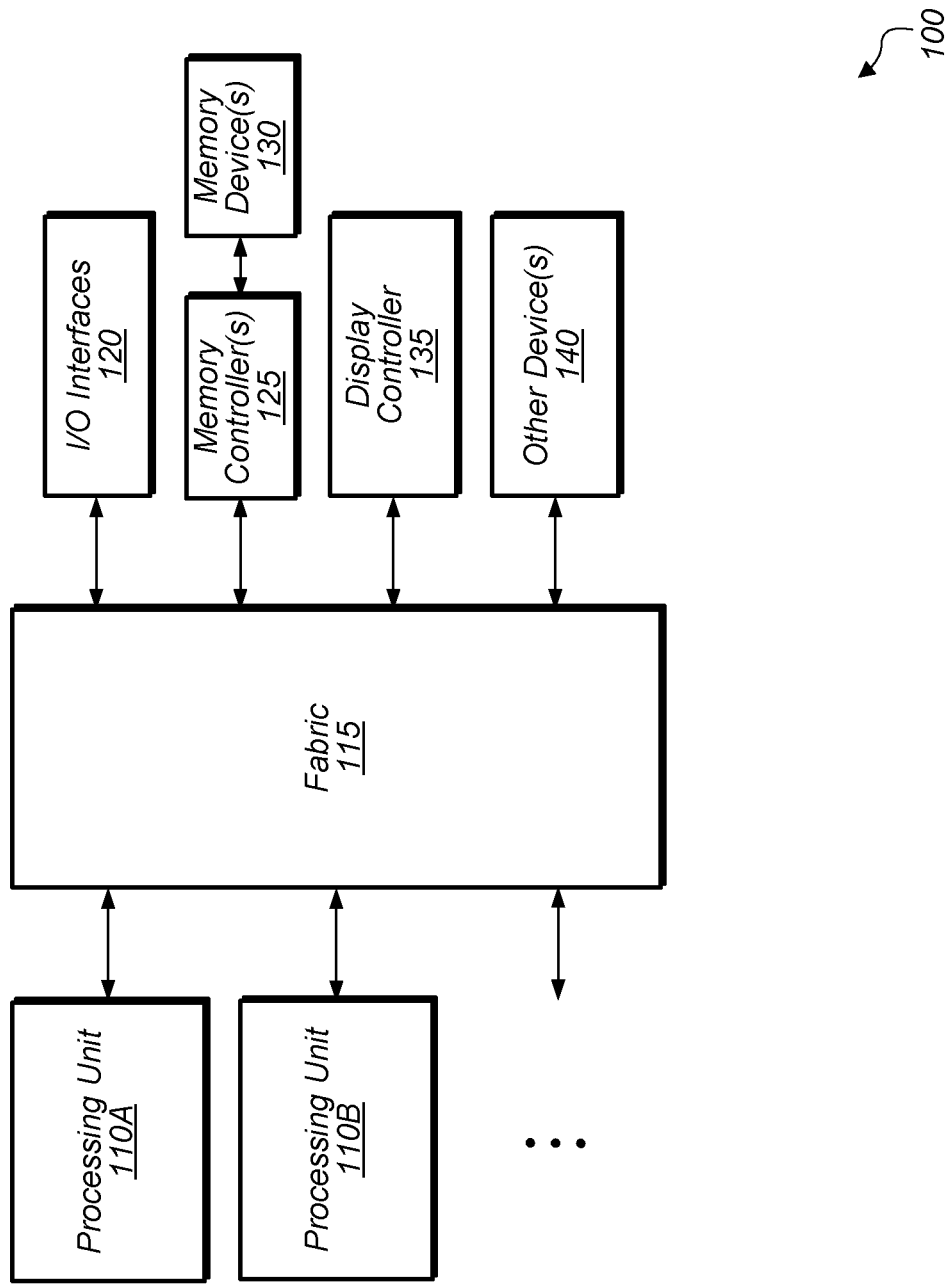
FIG. 1 is a block diagram of one implementation of a computing system.

Referring now to FIG. 1, a block diagram of one implementation of a computing system 100 is shown. In one implementation, computing system 100 includes at least processing units 110A-B, fabric 115, input/output (I/O) interfaces 120, memory controller(s) 125, memory device(s) 130, display controller 135, and other device(s) 140.

In other implementations, computing system 100 includes other components and/or computing system 100 is arranged differently. Processing units 110A-B are representative of any number and type of processing units. For example, in one implementation, processing unit 110A is a central processing unit (CPU) and processing unit 110B is a graphics processing unit (GPU). In other implementations, processing units 110A-B include other numbers and types of processing units (e.g., digital signal processor (DSP), field programmable gate array (FPGA), application specific integrated circuit (ASIC)).

Fabric 115 is representative of any communication interconnect and any protocol for communicating among the components of the system 100. Fabric 115 provides the data paths, switches, routers, multiplexers, controllers, and other logic that connect the processing units 110A-B, I/O interfaces 120, memory controller(s) 125, memory device(s) 130, and other device(s) 140 to each other. Fabric 115 handles the request, response, and data traffic, as well as probe traffic to facilitate coherency. Fabric 115 also handles interrupt request routing and configuration access paths to the various components of system 100. In various implementations, fabric 115 is bus-based, including shared bus configurations, cross bar configurations, and hierarchical buses with bridges. In various implementations, fabric 115 is packet-based, and is hierarchical with bridges, cross bar, point-to-point, or other interconnects. From the point of view of fabric 115, the other components of system 100 are referred to as "clients". Fabric 115 processes requests generated by various clients and passes the requests on to other clients. In one implementation, fabric 115 includes a plurality of arbitration points and a plurality of masters, with each master abstracting one or more clients and generating or proxying requests into the fabric for the clients. The arbitration points are also referred to as crossbars, switches, or routers.

Memory controller(s) 125 are representative of any number and type of memory controllers accessible by core complexes 105A-N. Memory controller(s) 125 are coupled to any number and type of memory devices(s) 130. Memory device(s) 130 are representative of any number and type of memory devices. For example, in various implementations, the type of memory in memory device(s) 130 includes Dynamic Random Access Memory (DRAM), Static Random Access Memory (SRAM), NAND Flash memory, NOR flash memory, Ferroelectric Random Access Memory (Fe-RAM), or others. Memory device(s) 130 are accessible by processing units 110A-B, I/O interfaces 120, display controller 135, and other device(s) 140 via fabric 115 and memory controller(s) 125. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)).

Various types of peripheral devices are coupled to I/O interfaces 120. Such peripheral devices include (but are not limited to) displays, keyboards, mice, printers, scanners, joysticks or other types of game controllers, media recording devices, external storage devices, network interface cards, and so forth. Other device(s) 140 are representative of any number and type of devices (e.g., multimedia device, video codec).

In various implementations, computing system 100 is a computer, laptop, mobile device, server or any of various other types of computing systems or devices. It is noted that the number of components of computing system 100 vary from implementation to implementation. There can be more or fewer of each component than the number shown in FIG. 1. It is also noted that computing system 100 can include other components not shown in FIG. 1. Additionally, in other implementations, computing system 100 is structured in other ways than shown in FIG. 1.

Figure 2:
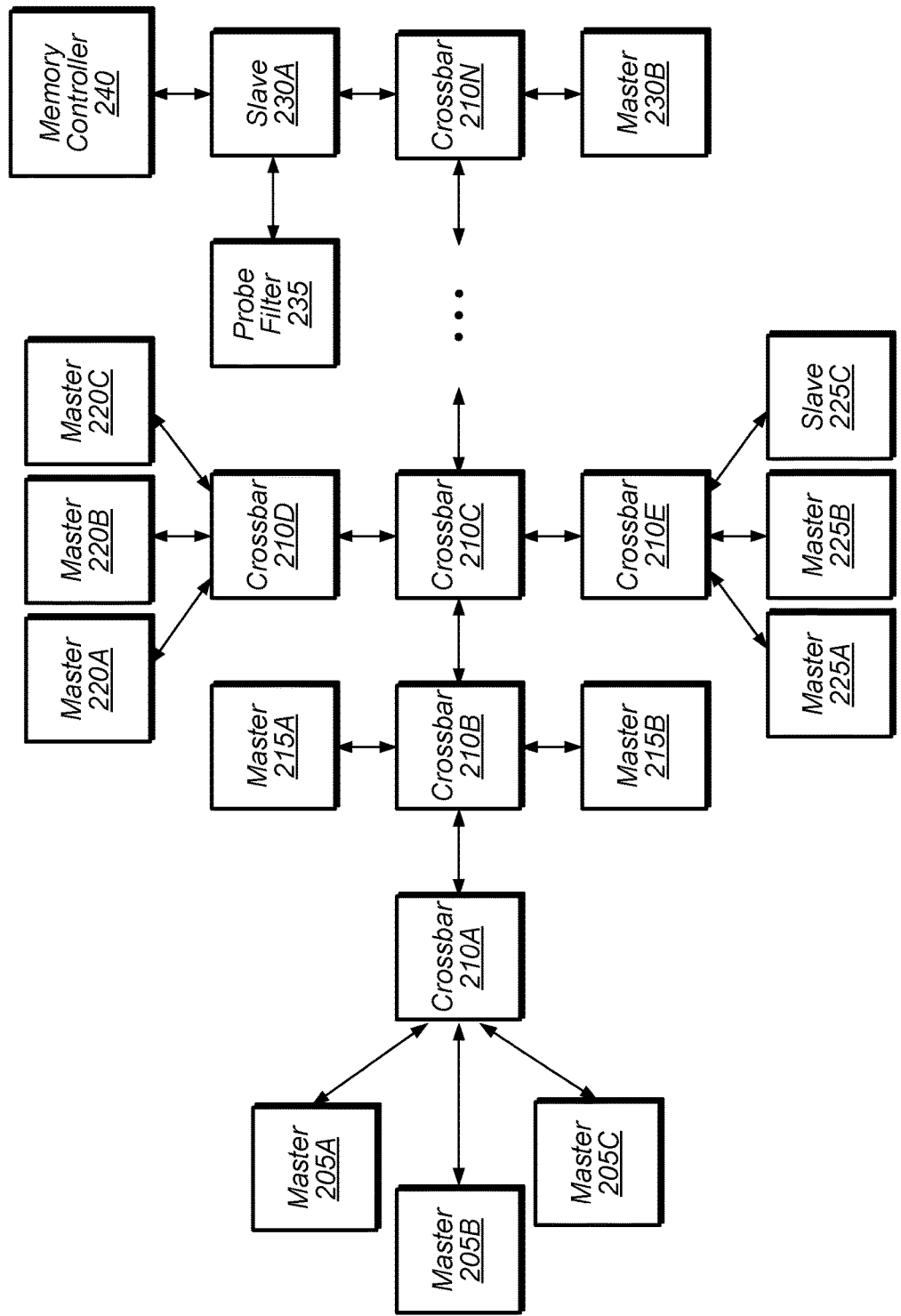
FIG. 2 is a block diagram of one implementation of crossbar connections in a communication fabric of a computing system.

Turning now to FIG. 2, a block diagram of one implementation of crossbar connections in a communication fabric of a computing system 200 is shown. The fabric includes a plurality of crossbars 210A-N, which are coupled to each other and to various masters and slaves throughout system 200. The number and topology of crossbars 210A-N varies from implementation to implementation. Each crossbar 210A-N can also be referred to as an arbitration point, switch, or router. Each master connected to a crossbar 210A-N abstracts one or more clients to the fabric and generates or proxies requests into the fabric for these clients. Depending on the implementation, a client is a processing unit (e.g., CPU, GPU), a display controller, an interrupt unit, a video codec, an I/O device, an I/O interface, a cache, a cache controller, coherence manager, or other types of components.

As shown in FIG. 2, masters 205A-C are coupled to crossbar 210A, with masters 205A-C representative of any number and type of masters. Similarly, the other masters shown connected to the various crossbars 210B-N of fabric 200 are also representative of any number and type of masters. Each master is also referred to as a source or a requester on the fabric. Accordingly, it should be understood that while a specific number of masters are shown connected to a given crossbar, the number varies from implementation to implementation. As used herein, a "master" is defined as a component that generates requests, and a "slave" is defined as a component that services requests.

As shown in FIG. 2, crossbar 210A is coupled to crossbar 210B, and masters 215A-B are coupled to crossbar 210B. Crossbar 210B is also coupled to crossbar 210C, and crossbar 210C is coupled to crossbars 210D and 210E. Masters 220A-C are coupled to crossbar 210D, and masters 225A-B and slave 225C are coupled to crossbar 210E. Any number of other crossbars, components, fabric components, and the like can be coupled in between crossbar 210C and crossbar 210N. Alternatively, crossbar 210C can be coupled directly to crossbar 210N. Slave 230A and master 230B are coupled to crossbar 210N, and slave 230A is also coupled to probe filter 235 and memory controller 240. Memory controller 240 is representative of any number of memory controllers which are coupled to any number of memory devices.

In one implementation, probe filter 235 is used to keep track of the cache lines that are currently in use by system 200. While only one probe filter 235 is shown in system 200, it should be understood that system 200 can have multiple probe filters, with each probe filter tracking cache lines for a given memory space or for one or more given memory device(s). A probe filter helps to reduce memory bandwidth and probe bandwidth by performing a memory request or probe request only when required. The operating principle of a probe filter is inclusivity (i.e., a line that is present in a cache within system 200 must be present in the probe filter). In one implementation, probe filter 235 includes cluster information to track a specific cluster in which a cache line resides. For example, each cluster includes a plurality of processing nodes, and the cluster information specifies which cluster, but not which processing node within the cluster, stores a particular cache line. In another implementation, probe filter 235 includes socket information to track a specific socket on which a cache line resides. A socket includes any number of clusters, with the number varying according to the implementation. In one implementation, system 200 includes two sockets, and probe filter 235 includes information on whether a particular cache line is shared by one socket or both sockets as well as on which cluster(s) the particular cache line resides. In some implementations, each probe filter may track independent cluster(s) for each socket in the system, or it may combine the cluster(s) for all the sockets in the system.

Figure 3:
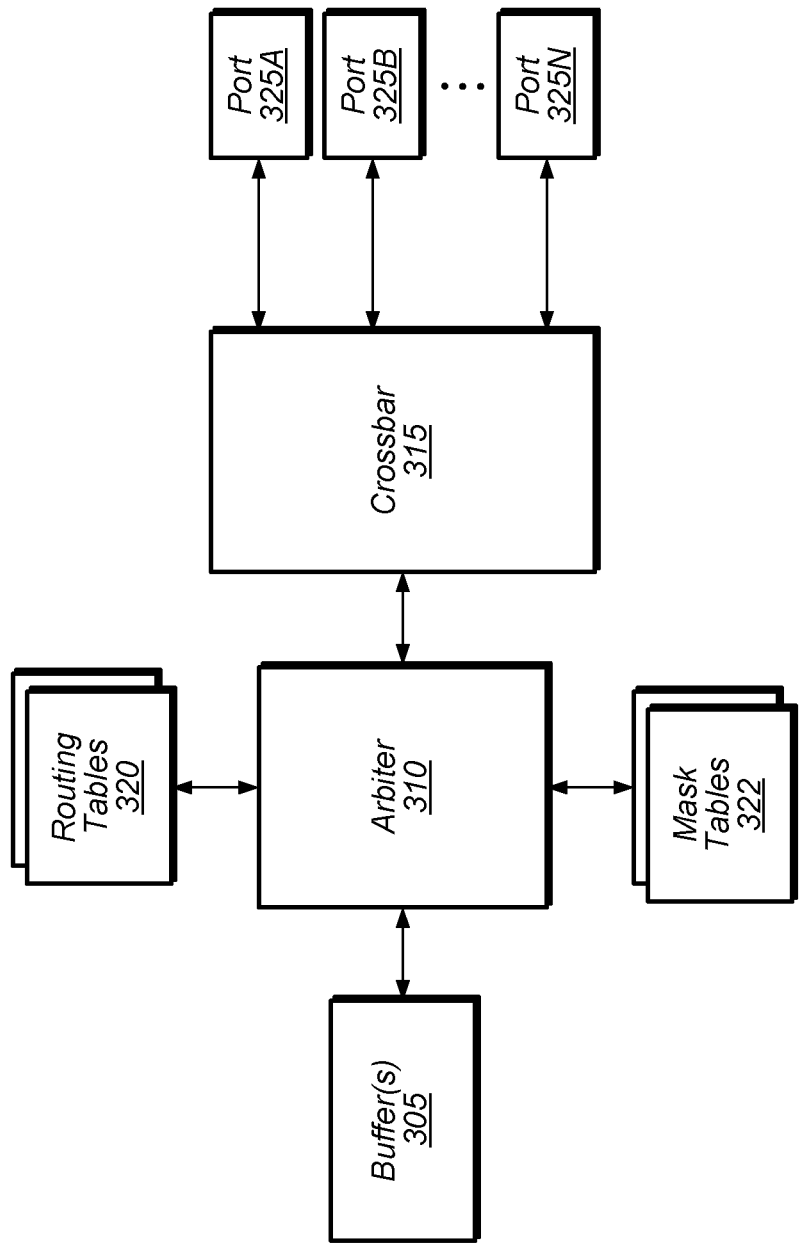
FIG. 3 is a block diagram of one implementation of an arbitration point.

Referring now to FIG. 3, a block diagram of one implementation of an arbitration point 300 is shown. In one implementation, the components of arbitration point 300 are implemented in each of crossbars 210A-N of FIG. 2. In one implementation, arbitration point 300 includes buffer(s) 305, arbiter 310, crossbar 315, routing tables 320, mask tables 322, and ports 325A-N. In other implementations, arbitration point 300 includes other and/or different components and is organized in other suitable manners. Buffer(s) 305 are representative of any number and type of buffers, queues, or other storage elements for buffering received requests. Arbiter 310 is coupled to buffer(s) 305, routing tables 320, mask tables 322, and to ports 325A-N via crossbar 315. Arbiter 310 determines which message(s) from buffer(s) 305 to process (e.g., forward on ports 325A-N) during a given cycle. It is noted that the terms "messages" and "packets" are used interchangeably herein. Ports 325A-N are representative of any number of input, output, or bidirectional ports.

In one implementation, each source or destination in the fabric (e.g., fabric 115 of FIG. 1) is assigned a fabric identifier (ID). When a multi-cast message is received by arbitration point 300 on one of ports 325A-N, arbiter 310 looks up routing tables 320 and mask tables 322 to determine the output ports on which to send the message. Routing tables 320 are representative of any number of tables which store routing entries. Each routing entry indicates on which ports to route a message, based on a source of the message, so that the message gets broadcast throughout the fabric. Mask tables 322 are representative of any number of tables which store any number of masks. In one implementation, one or more routes are retrieved from routing tables 320 and a plurality of masks are retrieved from mask tables 322. The plurality of masks retrieved from mask tables 322 are combined to create a final mask, and then the route(s) and the final mask are combined to create a port vector. The port vector is used to determine the ports on which to route a given message.

Figure 4:
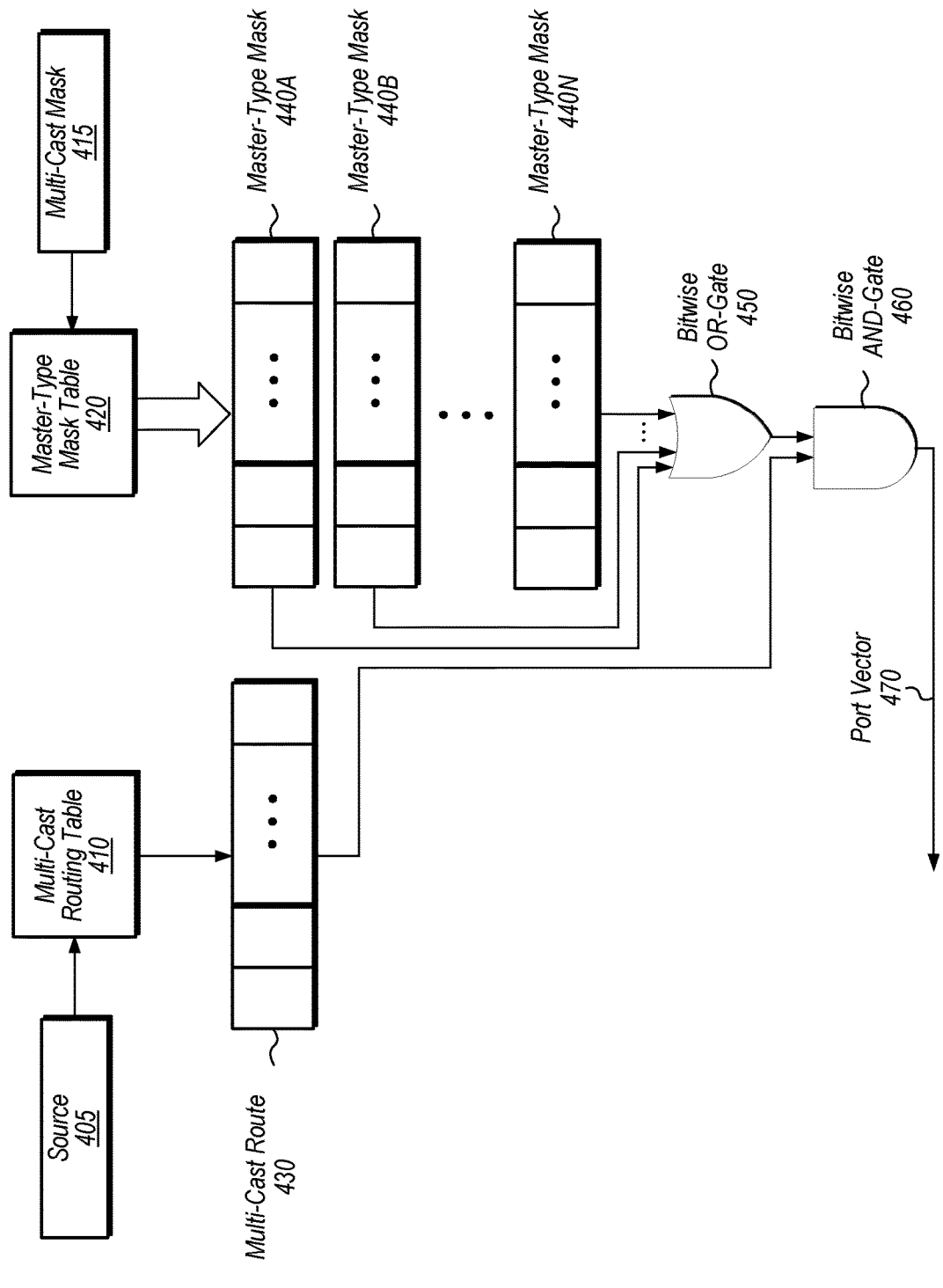
FIG. 4 is a block diagram of one implementation of port vector generation circuitry.

Turning now to FIG. 4, a block diagram of one implementation of port vector generation circuitry 400 is shown. In one implementation, a crossbar (e.g., crossbar 315 of FIG. 3) includes port vector generation circuitry 400. When a crossbar receives a message, the crossbar extracts the source field 405 and multi-cast mask field 415 from the message. In one implementation, source field 405 indicates the fabric ID of the agent that is the source of the message. It is noted that "multi-cast mask field" 415 can also be referred to as a "recipient type field" or a "recipient type indicator" herein.

The source field 405 is used as an index to lookup multi-cast routing table 410 to retrieve a multi-cast route 430. Multi-cast route 430 is a bit vector which indicates which ports of the crossbar lead to any master or link interface unit for the specific source. Generally speaking, this represents a first list of ports (e.g., base route information) that is subsequently modified to create a second list of ports using one or more masks. The crossbar also utilizes the multi-cast mask field 415 as an index into master-type mask table 420. In one implementation, the crossbar interprets multi-cast mask field 415 based on the value of a message type field retrieved from the message. An example of interpreting multi-cast mask field 415 based on the value of a message type field is described in further detail below in the discussion of FIG. 6. In one implementation, for each bit that is set in multi-cast mask field 415, the crossbar retrieves a corresponding master-type mask 440 from master-type mask table 420. The master-type masks 440A-N are representative of any number of masks which are retrieved from master-type mask table 420. Each master-type mask 440 is a bit vector which indicates if a given type of master is located down the path from a given port. For example, if there are six ports at the crossbar, then each master-type mask 440 includes six bits, with each bit specifying the existence of a specific type of master on the path leading out of the corresponding port. The retrieved master-type masks 440A-N are combined together in an OR-operation by bitwise OR-gate 450. The output of bitwise OR-gate 450 is combined together in an AND-operation with the multi-cast route 430. The output of bitwise AND-gate 460 is port vector 470 which indicates on which ports to send the multi-cast message. It is noted that the example of port vector generation circuitry 400 shown in FIG. 4 is illustrative of one particular implementation. It should be understood that in other implementations, port vector generation circuitry 400 includes other circuitry and/or is arranged in other suitable manners.

Figure 5:
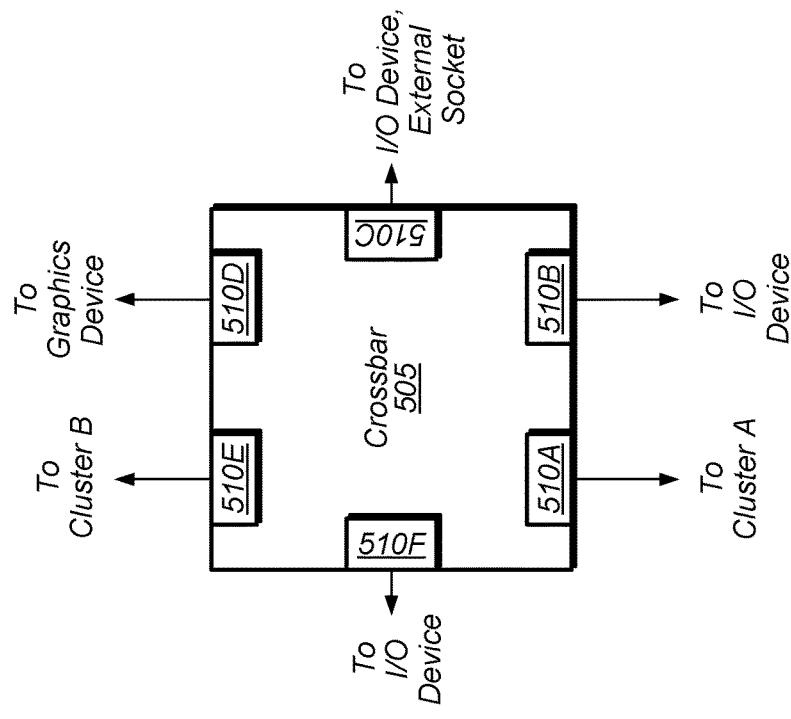
FIG. 5 is a block diagram of one implementation of a crossbar and a corresponding multi-cast routing table and master-type mask table.

Referring now to FIG. 5, a block diagram of one implementation of a crossbar 505 and corresponding multi-cast routing table 520 and master-type mask table 530 is shown. One example of a crossbar 505 with six ports 510A-F is shown on the left-side of FIG. 5. The functional units that are connected on the path leading out of each port 510A-F are listed at the termination of the arrows connected to each port 510A-F. For example, cluster A is on the path leading out of port 510A, an I/O device is on the path leading out of port 510B, an I/O device and an external socket are on the path leading out of port 510C, a graphics device is on the path out of port 510D, cluster B is on the path out of port 510E, and an I/O device is on the path out of port 510F.

It should be understood that the example of crossbar 505 and functional units on each port is exemplary only and specific to one particular implementation. Other implementations can have other numbers of ports with other numbers and types of functional units on the paths leading out of these ports. It is noted that the functional units listed as being on the path leading out of a given port do not need to be directly connected to the given port. Rather, there can be any number of other functional units, crossbars, or other components in between crossbar 505 and these listed functional units. It is also noted that a cluster (e.g., cluster A, cluster B) refers to a coherency cluster of multiple processing nodes. It is further noted that an external socket refers to a socket which is external to the socket containing crossbar 505 and which also includes multiple processing nodes. In some cases, the external socket includes a plurality of coherency clusters.

In one implementation, when crossbar 505 receives a multi-cast message, crossbar 505 retrieves a source ID (e.g., fabric ID), a message type indicator, and a recipient type indicator from the message. Crossbar 505 uses the source ID to select a route from multi-cast routing table 520. While there are two routes shown in table 520—first source route 540 and second source route 542, it should be understood that table 520 also includes any number of other entries. Crossbar 505 interprets the recipient type indicator based on the message type indicator. An example of an interpretation, in accordance with one implementation, is described further below in FIG. 6. Crossbar 505 uses a particular interpretation of the recipient type indicator to select one or more masks from master-type mask table 530. For example, in one implementation, the interpretation of the recipient type indicator determines a mapping of the bits of the recipient type indicator to a particular set of masks in master-type mask table 530. Then, based on this mapping, for each bit that is set in the recipient type indicator, crossbar 505 extracts the corresponding mask from master-type mask table 530. In one implementation, table 530 includes coherent agent mask 550, I/O device mask 552, graphics device mask 554, external socket mask 556, coherency cluster A mask 558, coherency cluster B mask 560, and any number of other masks. The number and type of masks stored in table 530 varies according to the implementation.

In one implementation, crossbar 505 combines the masks selected from table 530 into a single master mask. This single master mask is then combined, using a bitwise AND operation, with the route selected from table 520. The output from the bitwise AND operation is a port vector which specifies the ports on which the multi-cast message should be routed.

Figure 6:
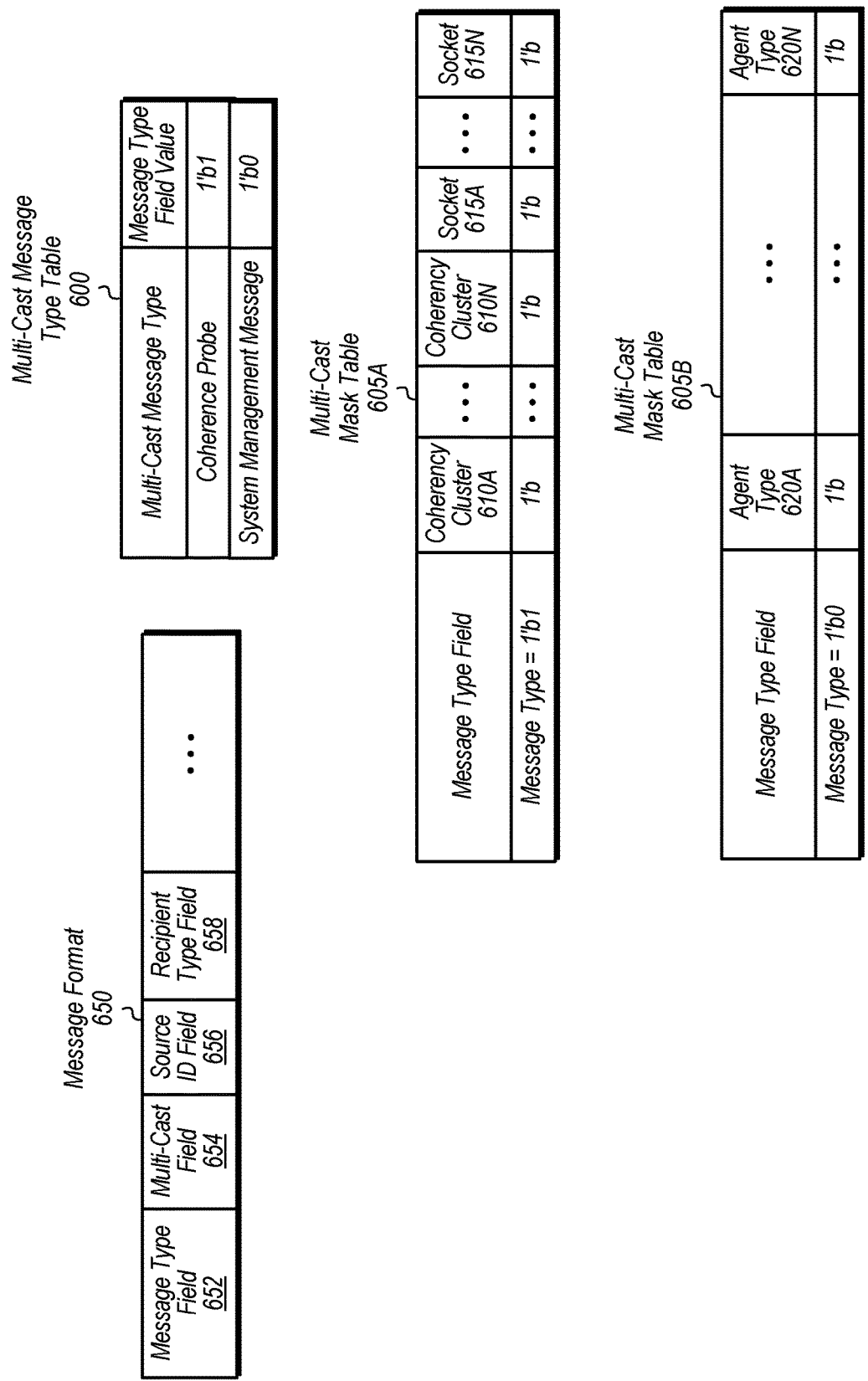
FIG. 6 illustrates tables for mapping message type to recipient type for a multi-cast message in accordance with one implementation.

Turning now to FIG. 6, tables for mapping message type to recipient type for a multi-cast message in accordance with one implementation are shown. In one implementation, there are two different multi-cast message types. These types are coherence probes and system management messages as shown in multi-cast message type table 600. In other implementations, other numbers and types of multi-cast messages are used with the type encoded and embedded in the message. One example of a message format is shown in message format 650. In one implementation, message format 650 includes message type field 652, multi-cast field 654, source ID field 656, recipient type field 658, and any number of other fields (e.g., message payload).

When a crossbar receives a multi-cast message, the crossbar extracts the message type field 652 from the message. The crossbar also extracts the recipient type field 658 from the message. The crossbar then interprets the recipient type field 658 according to the fields shown in multi-cast mask table 605A if the message is a coherence probe (e.g., message type field 652=1) or the crossbar interprets the recipient type field 658 according to the fields shown in multi-cast mask table 605B if the message is a system management message (e.g., message type field 652=0). In other words, if the message is a coherence probe, then the first bit of the recipient type field 658 indicates if the message should be sent to coherency cluster 610A, the Nth bit of the recipient type field 658 indicates if the message should be sent to coherency cluster 610N, the subsequent bit indicates if the message should be sent to socket 615A, and the last bit indicates if the message should be sent to socket 615N. If the message is a system management message, then the first bit of the recipient type field 658 indicates if the message should be sent to agent type 620A and the last bit indicates if the message should be sent to agent type 620N. The bits in between indicate if the message should be sent to the other agent types. It is to be understood that the ordering of bits in the mask table 605A is exemplary only. Other ways of organizing the data in the mask tables 605A and 605B are possible and are contemplated.

In one implementation, the fields 610A-N and 615A-N of table 605A specify the types of recipients which should receive the multi-cast message when the multi-cast message is a coherence probe. The fields 620A-N of table 605B specify the agent types that should receive the multi-cast message when the multi-cast message is a system management message. For example, in one implementation, agent type 620A is a coherent agent, agent type 620N is a graphics device, and the other agent types can correspond to other types of devices or functional units. In other implementations, agent types can be assigned in other manners. The agent which generates the multi-cast message populates the recipient type field in the message.

Once the agent(s) who should receive the multi-cast message are identified using table 605A or table 605B, then a lookup of a master-type mask table (e.g., master-type mask table 530 of FIG. 5) is performed with these identified agent(s) to select one or more masks. These masks are combined together to create a final master mask, which is then used to create a port vector for routing the multi-cast message. It should be understood that the examples shown in FIG. 6 are indicative of one particular implementation. In other implementations, other numbers of message types, other types of encodings for specifying recipient types, and/or other types of encodings for specifying message types are employed.

Figure 7:
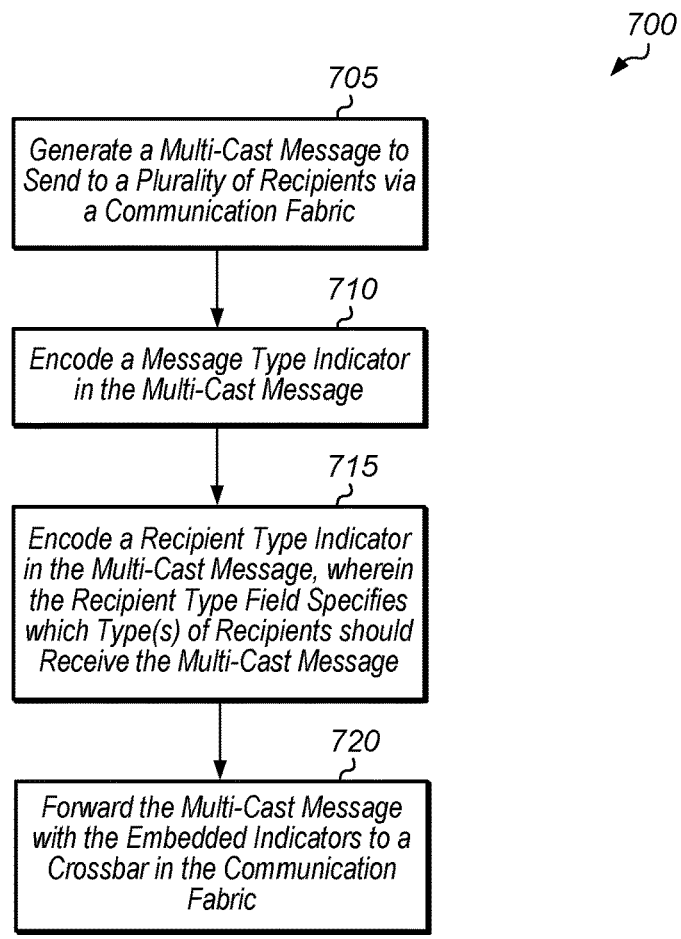
FIG. 7 is a generalized flow diagram illustrating one implementation of a method for generating a multi-cast message to send via a communication fabric.
Figure 8:
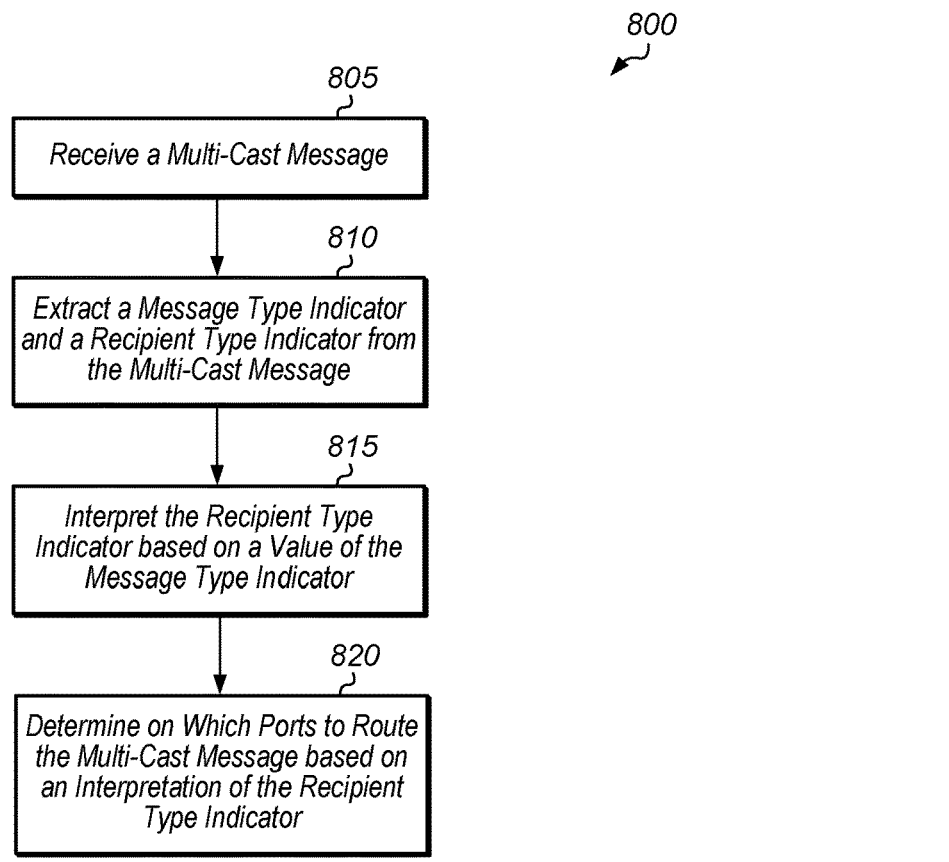
FIG. 8 is a generalized flow diagram illustrating one implementation of a method for processing a multi-cast message in a crossbar.
Figure 9:
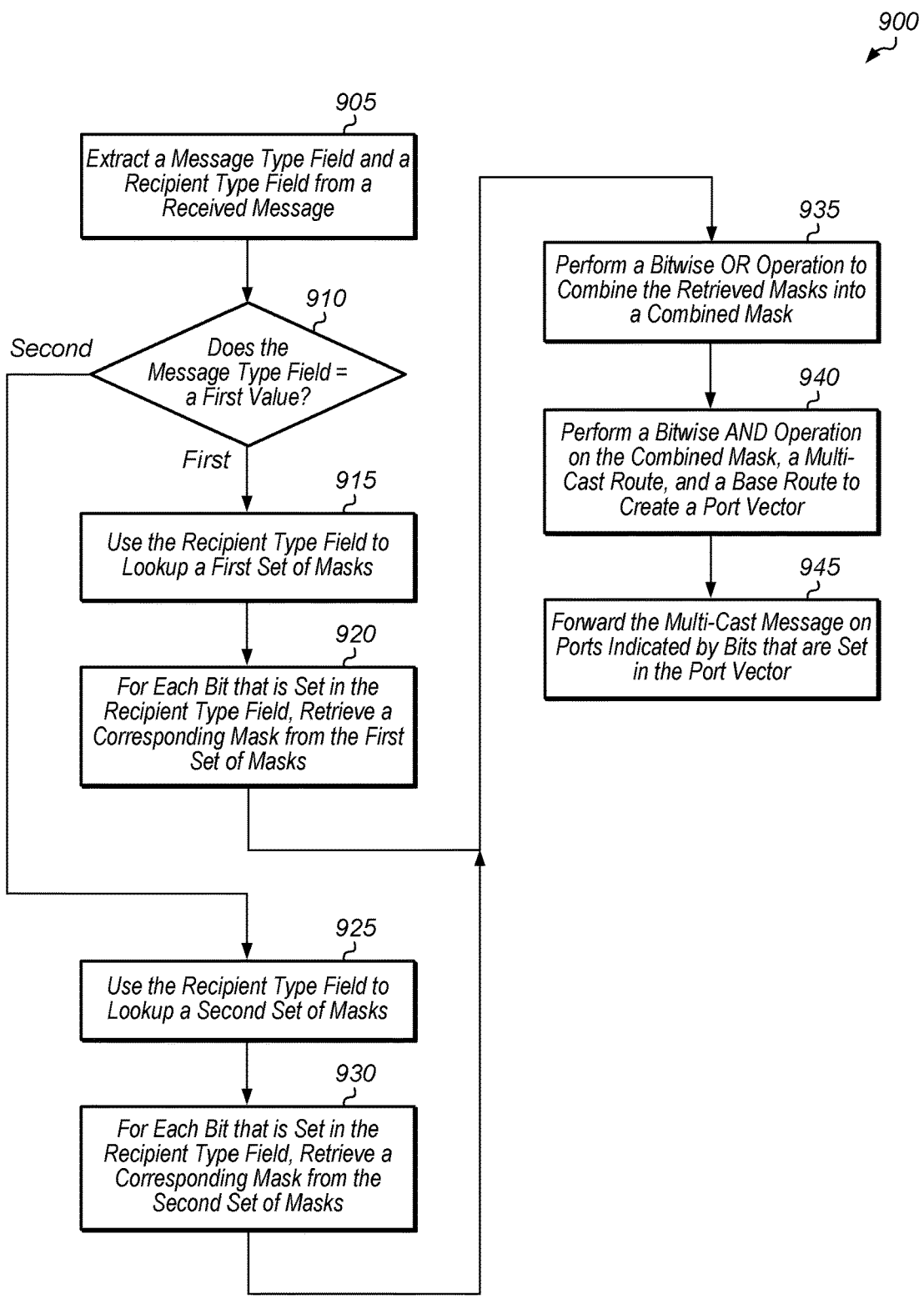
FIG. 9 is a generalized flow diagram illustrating one implementation of a method for determining where to forward a message based on an interpretation of a message type field extracted from the message.
Figure 10:
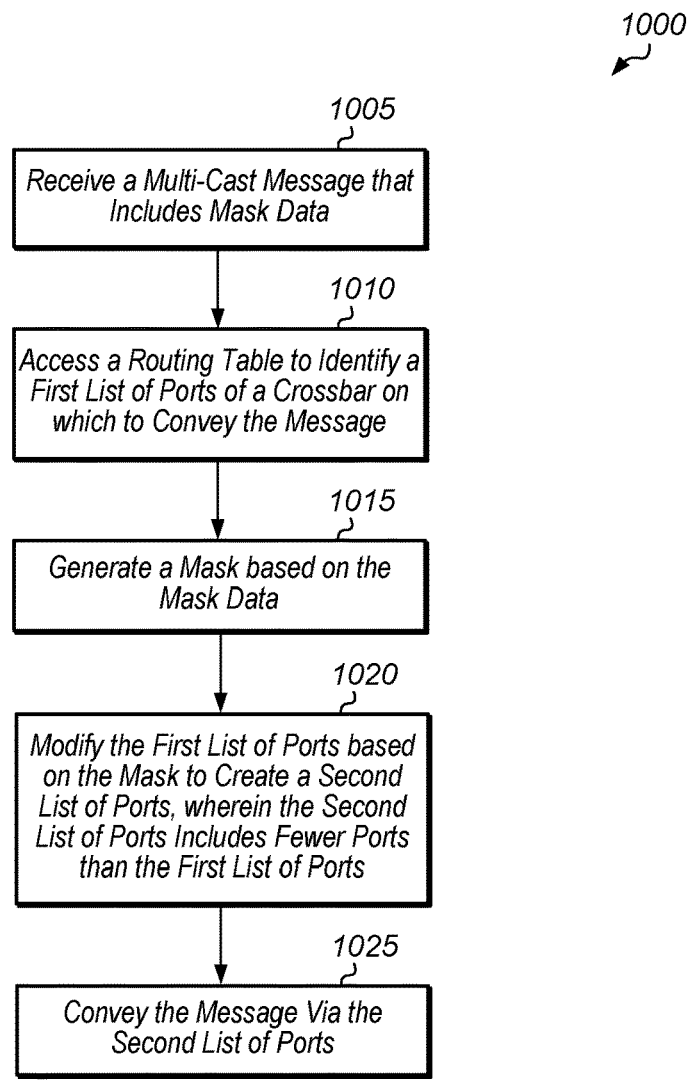
FIG. 10 is a generalized flow diagram illustrating one implementation of a method for determining how to route a multi-cast message.

Referring now to FIG. 7, one implementation of a method 700 for generating a multi-cast message to send via a communication fabric is shown. For purposes of discussion, the steps in this implementation and those of FIG. 8-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

An agent generates a multi-cast message to send to a plurality of recipients via a communication fabric (block 705). The agent is any of various types of agents, such as a processor (e.g., CPU, GPU), I/O device, or otherwise. As used herein, a "multi-cast message" is defined as a message which specifically identifies two or more potential recipients. A "multi-cast message" is generally contrasted with a "broadcast message" which does not specifically identify particular recipients but is simply broadcast to all listeners. In some implementations, specifically identifying potential recipients may be accomplished by including information in the message that identifies classes or types of recipients rather than individually identifying each specific potential recipient. Various such embodiments are possible and are contemplated. The agent encodes a message type indicator in the multi-cast message (block 710). For example, in one implementation, the message type indicator is a single bit. In this implementation, the message type indicator specifies whether the message is a coherency probe (e.g., indicator=1) or a system management message (e.g., indicator=0). In other implementations, other numbers of message types are employed and the message type indicator includes other numbers of bits to specify the message type. In some implementations, a slave coupled to the agent which generated the multi-cast message encodes the message type indicator in the message.

Also, the agent encodes a recipient type indicator in the multi-cast message, wherein the recipient type indicator specifies which type(s) of recipients should receive the multi-cast message (block 715). For example, in one implementation, if the message is a coherence probe, then the recipient type indicator specifies to which coherency clusters the message should be sent. In one implementation, the agent determines which coherency clusters to send the message by performing a lookup of a probe filter (e.g., probe filter 235 of FIG. 2). In one implementation, the system includes a plurality of coherency clusters, with each coherency cluster including a plurality of processing nodes. In other words, each coherency cluster includes a plurality of coherent agents. In this implementation, if the message is a system management message, then the recipient type indicator specifies to which types of agents the message should be sent. In other implementations, the recipient type indicator is interpreted in other manners. After block 715, the agent forwards the multi-cast message with the embedded indicators to a crossbar in the communication fabric (block 720). In one implementation, the agent forwards the multi-cast message to the crossbar via a coherent or non-coherent slave. After block 720, method 700 ends.

Turning now to FIG. 8, one implementation of a method 800 for processing a multi-cast message in a crossbar is shown. A crossbar receives a multi-cast message (block 805). The crossbar extracts a message type indicator and a recipient type indicator from the multi-cast message (block 810). Next, the crossbar interprets the recipient type indicator based on a value of the message type indicator (block 815). Then, the crossbar determines on which ports to route the multi-cast message based on an interpretation of the recipient type indicator (block 820). One example of determining on which ports to route the multi-cast message based on an interpretation of the recipient type indicator is described below in the discussion associated with method 900 of FIG. 9.

Referring now to FIG. 9, one implementation of a method 900 for determining where to forward a message based on an interpretation of a message type field extracted from the message is shown. A crossbar extracts a message type field and a recipient type field from a received message (block 905). If the message type field is equal to a first value (conditional block 910, "first" leg), then the crossbar uses the recipient type field to lookup a first set of masks (block 915). For each bit in the recipient type field that is set, the crossbar extracts a corresponding mask from the first set of masks (block 920). For example, if there are six bits in the recipient type field, then there are six different masks in the first set of masks. In this example, each bit in the recipient type field corresponds to a specific mask entry. If the message type field is equal to a second value (conditional block 910, "second" leg), then the crossbar uses the recipient type field to lookup a second set of masks (block 925). It should be understood the second set of masks are different from the first set of masks. Next, for each bit in the recipient type field that is set, the crossbar extracts a corresponding mask from the second set of masks (block 930).

After blocks 920 and 930, the crossbar performs a bitwise OR operation to combine the retrieved masks into a combined mask (block 935). Next, the crossbar performs a bitwise AND operation on the combined mask, a multi-cast route, and a base route to create a port vector (block 940). Next, the crossbar forwards the multi-cast message on ports indicated by bits that are set in the port vector (block 945). After block 945, method 900 ends. It is noted that in other implementations, the message type field includes more than one bit to specify more than two different types of messages. In these implementations, the message type field specifies which set of masks to lookup using the recipient type field.

Turning now to FIG. 10, one implementation of a method 1000 for determining how to route a multi-cast message is shown. A crossbar receives a multi-cast message that includes mask data (block 1005). In one implementation, the mask data includes at least a message type field and a recipient type field. In one implementation, at least two different types of messages are specified by the message type field, and a first message type is a coherence probe. In one implementation, when the message type field specifies that the message is a coherence probe, the recipient type field specifies to which sockets and coherency clusters the multi-cast message should be forwarded. It is noted that in this case, the recipient type field specifies a particular coherency cluster without identifying any node within that cluster that should receive the message.

Next, the crossbar accesses a routing table to identify a first list of ports of the crossbar on which to convey the message (block 1010). Then, the crossbar generates a mask based on the mask data (block 1015). Next, the crossbar modifies the first list of ports based on the mask to create a second list of ports, wherein the second list of ports includes fewer ports than the first list of ports (block 1020). Then, the crossbar conveys the message via the second list of ports (block 1025). After block 1025, method 1000 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a plurality of agents, each comprising circuitry configured to convey and receive messages; and
a communication fabric, comprising a plurality of crossbars, coupled to communicate messages between a plurality of agents;
wherein each crossbar of the plurality of crossbars comprises circuitry configured to:
generate a first list of ports comprising a plurality of ports of the crossbar used to determine on which of the plurality of ports of the crossbar to convey a multi-cast message;
generate a mask based on mask data of the multi-cast message;
modify the first list of ports based on the mask to create a second list of ports different from the first list of ports on which to convey the multi-cast message based at least in part on an interpretation of a recipient type field, wherein the recipient type field is interpreted in a first manner responsive to a message type field of the mask data being equal to a first value and a second manner responsive to the message type field being equal to a second value; and
convey the multi-cast message, via the second list of ports, from the crossbar to an agent of the plurality of agents.

2. The system as recited in claim 1, wherein the circuitry of each crossbar is configured to access a routing table to generate, based on information of the multi-cast message, a given entry of a plurality of entries of the routing table, wherein the given entry indicates the first list of ports.

3. The system as recited in claim 1, wherein:
interpreting the recipient type field in the first manner comprises performing a lookup of a first set of masks based on data included in the recipient type field; and
interpreting the recipient type field in the second manner comprises performing a lookup of a second set of masks based on the data included in the recipient type field, wherein the second set of masks is different from the first set of masks.

4. The system as recited in claim 3, wherein the circuitry of each crossbar is further configured to:
perform a bit-wise logical OR operation on a first plurality of masks to generate a master mask with the first list of ports;
perform a bit-wise logical AND operation on the master mask and a route to generate a port vector with the second list of ports; and
route the multi-cast message to ports which have corresponding indicators set in the port vector.

5. The system as recited in claim 4, wherein the first plurality of masks are retrieved from the first set of masks based on which bits are set in the recipient type field.

6. The system as recited in claim 4, wherein when the message type field specifies that the message is a coherence probe, the recipient type field specifies to which sockets and coherency clusters the multi-cast message should be forwarded.

7. A method comprising:
generating, by circuitry of a crossbar in a communication fabric, a first list of ports comprising a plurality of ports of the crossbar used to determine on which of the plurality of ports of the crossbar to convey a multi-cast message;
generating, by the circuitry, a mask based on mask data of the multi-cast message;
modifying, by the circuitry, the first list of ports based on the mask to create a second list of ports different from the first list of ports on which to convey the multi-cast message based at least in part on an interpretation of a recipient type field, wherein the recipient type field is interpreted in a first manner responsive to a message type field of the mask data being equal to a first value and a second manner responsive to the message type field being equal to a second value; and
conveying, by the circuitry, the multi-cast message, via the second list of ports, from the crossbar to an agent of a plurality of agents.

8. The method as recited in claim 7, wherein the method further comprises accessing, by the circuitry, a routing table to generate, based on information of the multi-cast message, a given entry of a plurality of entries of the routing table, wherein the given entry indicates the first list of ports.

9. The method as recited in claim 7, wherein:
interpreting the recipient type field in the first manner comprises performing a lookup of a first set of masks based on data included in the recipient type field; and
interpreting the recipient type field in the second manner comprises performing a lookup of a second set of masks based on data included in the recipient type field, wherein the second set of masks is different from the first set of masks.

10. The method as recited in claim 9, further comprising:
performing a bit-wise logical OR operation on a first plurality of masks to generate a master mask;
performing a bit-wise logical AND operation on the master mask and a route to generate a port vector; and
routing the multi-cast message to ports which have corresponding indicators set in the port vector.

11. The method as recited in claim 10, wherein the first plurality of masks are retrieved from the first set of masks based on which bits are set in the recipient type field.

12. The method as recited in claim 10, wherein when the message type field specifies that the message is a coherence probe, the recipient type field specifies to which sockets and coherency clusters the multi-cast message should be forwarded.

13. An apparatus comprising:
a buffer configured to store messages;
an arbiter configured to determine which message of one or more messages stored in the buffer to process; and
a crossbar coupled to the arbiter;
wherein the crossbar comprises circuitry configured to:
generate a first list of ports comprising a plurality of ports of the crossbar used to determine on which of the plurality of ports of the crossbar to convey a multi-cast message;
generate a mask based on mask data of the multi-cast message;
modify the first list of ports based on the mask to create a second list of ports different from the first list of ports on which to convey the multi-cast message based at least in part on an interpretation of a recipient type field, wherein the recipient type field is interpreted in a first manner responsive to a message type field of the mask data being equal to a first value and a second manner responsive to the message type field being equal to a second value; and
convey the multi-cast message, via the second list of ports, from the crossbar to an agent of a plurality of agents.

14. The apparatus as recited in claim 13, wherein the circuitry of the crossbar is configured to access a routing table to generate, based on information of the multi-cast message, a given entry of a plurality of entries of the routing table, wherein the given entry indicates the first list of ports.

15. The apparatus as recited in claim 13, wherein:
interpreting the recipient type field in the first manner comprises performing a lookup of a first set of masks based on data included in the recipient type field; and
interpreting the recipient type field in the second manner comprises performing a lookup of a second set of masks based on the data included in the recipient type field, wherein the second set of masks is different from the first set of masks.

16. The apparatus as recited in claim 15, wherein the apparatus is further configured to:
perform a bit-wise logical OR operation on a first plurality of masks to generate a master mask;
perform a bit-wise logical AND operation on the master mask and a first route to generate a port vector; and
route the multi-cast message to ports which have corresponding indicators set in the port vector.

17. The apparatus as recited in claim 16, wherein when the message type field specifies that the message is a coherence probe, the recipient type field specifies to which sockets and coherency clusters the multi-cast message should be forwarded.

* * * * *